United States Patent
Cho et al.

(10) Patent No.: US 10,120,508 B2
(45) Date of Patent: Nov. 6, 2018

(54) TOUCH SENSOR

(71) Applicant: Samsung Display Co., Ltd., Yongin-si (KR)

(72) Inventors: Se Hyoung Cho, Hwaseong-si (KR); Il Gon Kim, Seoul (KR); Kyung-Hoon Kim, Uiwang-si (KR); Sang Jin Jeon, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 55 days.

(21) Appl. No.: 14/852,830

(22) Filed: Sep. 14, 2015

(65) Prior Publication Data

US 2016/0209954 A1    Jul. 21, 2016

(30) Foreign Application Priority Data

Jan. 15, 2015  (KR) ......................... 10-2015-0007629

(51) Int. Cl.
*G06F 3/044* (2006.01)
*G06F 3/0488* (2013.01)

(52) U.S. Cl.
CPC ............ *G06F 3/044* (2013.01); *G06F 3/0488* (2013.01); *G06F 2203/04111* (2013.01)

(58) Field of Classification Search
CPC ..... G06F 3/0488; G06F 3/04883; G06F 3/044
See application file for complete search history.

(56) References Cited

U.S. PATENT DOCUMENTS

| | | | | |
|---|---|---|---|---|
| 8,411,045 B2* | 4/2013 | Futter | .................... | G06F 1/3231 |
| | | | | 345/173 |
| 8,525,799 B1* | 9/2013 | Grivna | .................. | G06F 3/0416 |
| | | | | 345/173 |
| 9,634,660 B2* | 4/2017 | Trend | ...................... | G06F 3/044 |
| 9,817,525 B2* | 11/2017 | Lu | ........................... | G06F 3/044 |
| 2010/0079384 A1* | 4/2010 | Grivna | .................... | G06F 3/041 |
| | | | | 345/173 |
| 2010/0149125 A1* | 6/2010 | Klinghult | .............. | G06F 3/0412 |
| | | | | 345/174 |
| 2012/0113047 A1* | 5/2012 | Hanauer | ............... | G06F 3/0416 |
| | | | | 345/174 |
| 2014/0253499 A1* | 9/2014 | Lee | ......................... | G06F 3/044 |
| | | | | 345/174 |
| 2015/0075959 A1* | 3/2015 | Lu | ........................ | G06F 3/0416 |
| | | | | 200/5 R |
| 2015/0091858 A1* | 4/2015 | Rosenberg | ............ | G06F 3/0414 |
| | | | | 345/174 |

FOREIGN PATENT DOCUMENTS

| KR | 10-1293017 | 8/2013 |
|---|---|---|
| KR | 10-2013-0115692 | 10/2013 |
| KR | 10-2013-0138487 | 12/2013 |

* cited by examiner

*Primary Examiner* — Alexander Eisen
*Assistant Examiner* — Mansour M Said
(74) *Attorney, Agent, or Firm* — H.C. Park & Associates, PLC

(57) ABSTRACT

A touch sensor including first touch electrode lines extending in one direction and second touch electrode lines extending in a diagonal direction sloped with respect to the first touch electrode lines. A first touch electrode line intersects a second touch electrode line.

17 Claims, 5 Drawing Sheets

TOUCH SENSOR

CROSS-REFERENCE TO RELATED APPLICATION

This application claims priority from and the benefit of Korean Patent Application No. 10-2015-0007629, filed on Jan. 15, 2015, which is hereby incorporated by reference for all purposes as if fully set forth herein.

BACKGROUND

Field

Exemplary embodiments relate to a touch sensor and touch panel having the same.

Discussion of the Background

Display devices, such as a liquid crystal display (LCD), an organic light emitting display device, and an electrophoretic display, include an electric field generating electrode and an electro-optical active layer. For example, an organic light emitting display device includes an organic light emitting layer as an electro-optical active layer. An electric field generating device may be connected to a switching element, such as a thin film transistor to receive a data signal, and an electro-optical active layer may converts, such a data signal into an optical signal to display an image.

The use of heavy and easily damaged glass substrates in a display panel of a display device limits the portability of a display. Recently, light, flexible, and impact resistant plastic substrates have been actively developed for flexible display devices.

Display devices may include a touch sensing function allowing for a user to interact with the display in addition to the function to display an image. The touch sensing function enables a display device to obtain contact information (i.e., input) from a user. For example, the touch sensing display may sense when an object approaches or comes into contact with its screen. The touch sensing display may determine a contact position of the object by sensing a change in pressure, electric charge, light, and the like, applied to the screen when a user brings his or her finger or a touch pen into contact with a screen or places the same in proximity to the screen to write down characters or draw a picture. The display device may receive an image signal on the basis of such contact information and display an image.

The touch sensing function may be realized through a touch sensor. The touch sensor may be classified according to various schemes, such as a resistive type touch sensor, a capacitive type touch sensor, an electromagnetic (EM) type sensor, and an optical type sensor The capacitive type touch sensor includes a plurality of touch electrodes capable of transmitting a sensing signal. A touch electrode may form a sensing capacitor together with another touch electrode (mutual-capacitor type) or form a sensing capacitor together with an external object (self-capacitor type). When a conductor, such as a finger, approaches a touch sensor or comes into contact with the touch sensor, capacitance of the sensing capacitor or a charged quantity of electric charge is changed to recognize whether a contact has been made and a contact position, or the like.

A plurality of touch electrodes are disposed in a touch sensing area in which a contact may be sensed, and may be connected to a plurality of signal transmission lines that transmit a sensing signal. The signal transmission lines may be positioned in a non-sensing region near the touch sensing area. The signal transmission line may transmit a sensed input signal to a touch electrode or may transmit a sensing output signal of a touch electrode generated according to a touch to a sensing signal control unit.

The touch sensor may be installed in a display device (in-cell type) or directly formed on an outer surface of a display device (on-cell type). Alternatively, a separate touch sensor unit may be attached to a display device (add-on cell type). With a flexible display device, the touch sensor is generally formed on the display panel as a film or as a separate plate-type touch sensor unit attached on the display panel (add-on cell type).

A mutual capacitive type touch sensor may include an input touch electrode for receiving a sensing input signal and an output touch electrode for transmitting a sensing output signal. When this type of touch sensor is used, the signal lines connected to the input touch electrodes and the output touch electrodes are formed in the peripheral areas (non-sensing region) resulting in an increase in a width of the peripheral areas. The increase in a width of the peripheral areas may result in larger electronic circuitry and larger devices (e.g., mobile phones, tablets) or may limit the valuable space in electronic circuitry for other components.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch panel having advantages of minimizing a width of a peripheral area in a touch panel including a mutual capacitive type touch sensor.

Additional aspects will be set forth in the detailed description which follows, and, in part, will be apparent from the disclosure, or may be learned by practice of the inventive concept.

An exemplary embodiment discloses a touch sensor including first touch electrode lines extending in one direction and second touch electrode lines extending in a diagonal direction sloped with respect to the first touch electrode lines. A first touch electrode line intersects a second touch electrode line.

An exemplary embodiment also discloses a touch panel including: a substrate including a touch sensing area and a peripheral area positioned on an outer side of the touch sensing area, a plurality of first touch electrode lines disposed in the touch sensing area, a plurality of second touch electrode lines extending in a diagonal direction sloped with respect to the first touch electrode lines and disposed in the touch sensing area, a plurality of first pad signal lines connected to the first and second touch electrode lines and disposed on one side of the peripheral area, and a plurality of second pad signal lines connected to the second touch electrode lines and disposed on a same side of the peripheral area as the first pad signal lines. Two second touch electrode lines have different lengths.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
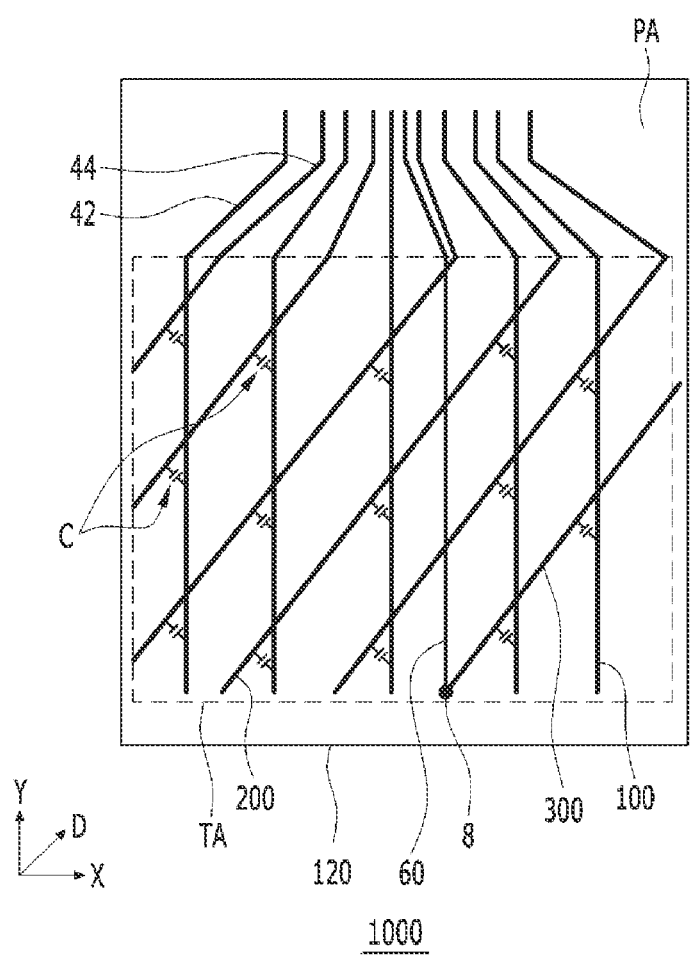
FIG. 1 is a schematic circuit diagram of a touch panel according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

When the touch electrode lines are formed in the manner according to an exemplary embodiment disclosed herein, the number of signal lines positioned in the peripheral area of the touch electrodes can be reduced, which also reduces a width of the peripheral area. Accordingly, a bezel width of a touch panel including the touch sensor may be reduced as well.

Hereinafter, a touch panel according to an exemplary embodiment will be described in detail with reference to the accompanying drawings.

FIG. 1 is a schematic circuit diagram of a touch panel according to an exemplary embodiment.

As illustrated in FIG. 1, a touch panel 1000 according to an exemplary embodiment includes a substrate 120 having a touch sensing area TA for sensing a touch and a peripheral area PA positioned on an outer side of the touch sensing area TA.

A plurality of first touch electrode lines 100 and a plurality of second touch electrode lines 200 are formed in the touch sensing area TA.

The first touch electrode lines 100 extend in one direction (Y), and the second touch electrode lines 200 extend in a diagonal direction (D) sloped with respect to the first touch electrode lines 100. The diagonal direction (D) is a direction extending between the X axis and the Y axis.

The first touch electrode lines 100 include a plurality of first touch electrodes (not shown). The plurality of first touch electrodes included in the first touch electrode lines may be electrically connected by connection electrodes. The second touch electrode lines 200 may include a plurality of second touch electrodes (not shown). Similar to the first touch electrodes, the plurality of second touch electrodes (not shown) included in the second touch electrode lines may be electrically connected by connection electrodes.

Among the first touch electrodes and the second touch electrodes included in the first touch electrode line 100 and the second touch electrode lines 200, mutually neighboring touch electrodes form a mutual sensing capacitor C, which serves as a touch sensor. The mutual sensing capacitor may receive a sensing input signal through one of the first and second touch electrodes due to a contact from an external object. Based on receiving the sensing input signal, the mutual sensing capacitor may output a change in a quantity of electric charge as a sensing output signal through the other touch electrode.

The first touch electrode lines 100 and the second touch electrode lines 200 may be connected to a driving unit (not shown) through pad signal lines 42 and 44 positioned in the peripheral area PA. The plurality of pad signal lines 42 and 44 are positioned in the peripheral area PA on one side of the touch area TA. The pad signal lines 42 and 44 connect the first touch electrode lines 100 and the second touch electrode lines 200 to the driving unit.

The driving unit may be directly mounted in as an integrated circuit chip on a pad (not shown) at one end of the pad signal lines 42 and 44. The driving unit may be mounted on a flexible printed circuit film and connected as a TCP to the pad. Alternatively, the driving unit may be mounted on a separate printed circuit board (PCB) and connected to the pad. The driving unit may be connected to the first touch electrode lines 100 and the second touch electrode lines 200 through the pad. More specifically, the driving unit may be electrically coupled to the first touch electrode lines 100 through the first pad signal lines 42 and electrically coupled to the second touch electrode lines 200 through the second pad signal lines 44.

The first touch electrode lines 100 may extend in a direction parallel to one side of a rectangular shape (e.g., the Y axis direction) in the touch sensing area TA having a substantially rectangular shape. Most of the first touch electrode lines 100 are positioned in the touch area TA have substantially similar lengths.

The second touch electrode lines 200 are formed in a diagonal direction within the substantially rectangular touch area TA. Unlike the first touch electrode lines 100, the second touch electrode lines 200 may have varying lengths. Second touch electrode lines 200 closer to the center of the substantially rectangular touch area TA may be longer than second touch electrodes 200 closer toward the corners of the touch sensing area TA (i.e., further from the center of the touch sensing area TA).

The second touch electrode lines 200, positioned to be relatively adjacent to the second pad signal lines 44, may be directly connected to the second pad signal lines 44. However, a second touch electrode line 300, positioned relatively away from the second pad signal lines 44, may be connected to the driving unit by using a connection signal line 60.

The connection signal line 60 may be positioned between the first touch electrode lines 100 and may be directly connected (80) to the second touch electrode line 300 adjacent to the edge. When an insulating layer, or the like, is formed, the connection signal line 60 may be connected to the second touch electrode line 300 through a contact hole. When the connection signal line 60 is positioned between the first touch electrode lines 100, the connection signal line 60 may be formed of a material different from that of the first touch electrode lines 100 and the second touch electrode lines 200. However, the connection signal line 60 may be formed in the peripheral area PA (not shown) and may be formed of the same material as that of the first touch electrode lines 100 or the second touch electrode lines 200.

Figure 2:
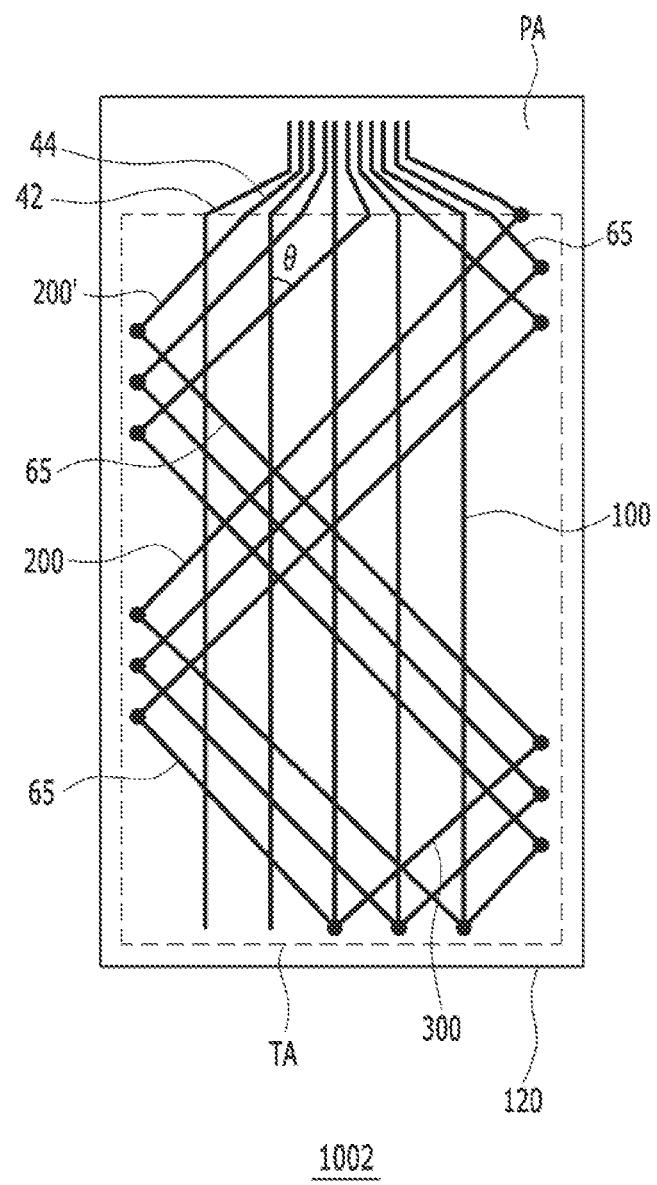
FIG. 2 is a schematic circuit diagram of a touch panel according to another exemplary embodiment.

FIG. 2 is a schematic circuit diagram of a touch panel according to another exemplary embodiment.

In an embodiment, components identical to those mentioned above with reference to FIG. 1 are designated by like reference numerals, and their detailed descriptions are not repeated to avoid redundancy.

A touch panel 1002 illustrated in FIG. 2 includes a substrate 120 having a touch sensing area TA for sensing a touch, and a peripheral area PA positioned on an outer side of the touch sensing area TA. A plurality of first touch electrode lines 100 and a plurality of second touch electrode lines 200, 300 are formed in the touch sensing area TA.

The second touch electrode lines 200, 300 shown in FIG. 2 are sloped with respect to the first touch electrode lines 100, and in this case, the second touch electrode lines 200 may be sloped at an angle θ smaller than the angle at which the second touch electrode lines 200 of FIG. 1 are sloped, with respect to the first touch electrode lines 100.

Unlike the connection signal lines 60 of FIG. 1, connection signal lines 65 of FIG. 2 may be formed to slope with respect to the first touch electrode lines 100. The connection signal lines 65 may be sloped in a direction opposite to the direction of the second touch electrode lines 200, 300.

The connection signal lines 65 shown in FIG. 2 may connect one end of the second touch electrode lines 200 directly to second pad signal lines 44. However, other connection signal lines 65 may indirectly connect one end of second touch electrode lines 300 to the second pad signal lines 44 through second touch electrode lines 200'. Specifically, the connection signal lines 65 may diagonally traverse the touch area TA from the upper left corner to the lower right corner and connect the one end of second touch electrode lines 200' to one end of second touch electrode lines 300. Similarly, different connection signal lines 65 may diagonally traverse the lower left corner of the touch area TA and indirectly connect a different end of the second touch electrode lines 300 to second pad signal lines 44 through second touch electrode lines 200. All connection signal lines 65 may be parallel.

As described above, when the second touch electrode lines 200, 300 are formed in a diagonal direction to intersect the first touch electrode lines 100, a width of the peripheral area for forming pad signal lines 42, 44 for connecting the first touch electrode lines or the second touch electrode lines to the driving unit may be reduced. When the width of the peripheral area is reduced, a bezel width of an organic light emitting display device or a liquid crystal display device including such a touch panel may also be reduced.

Figure 3:
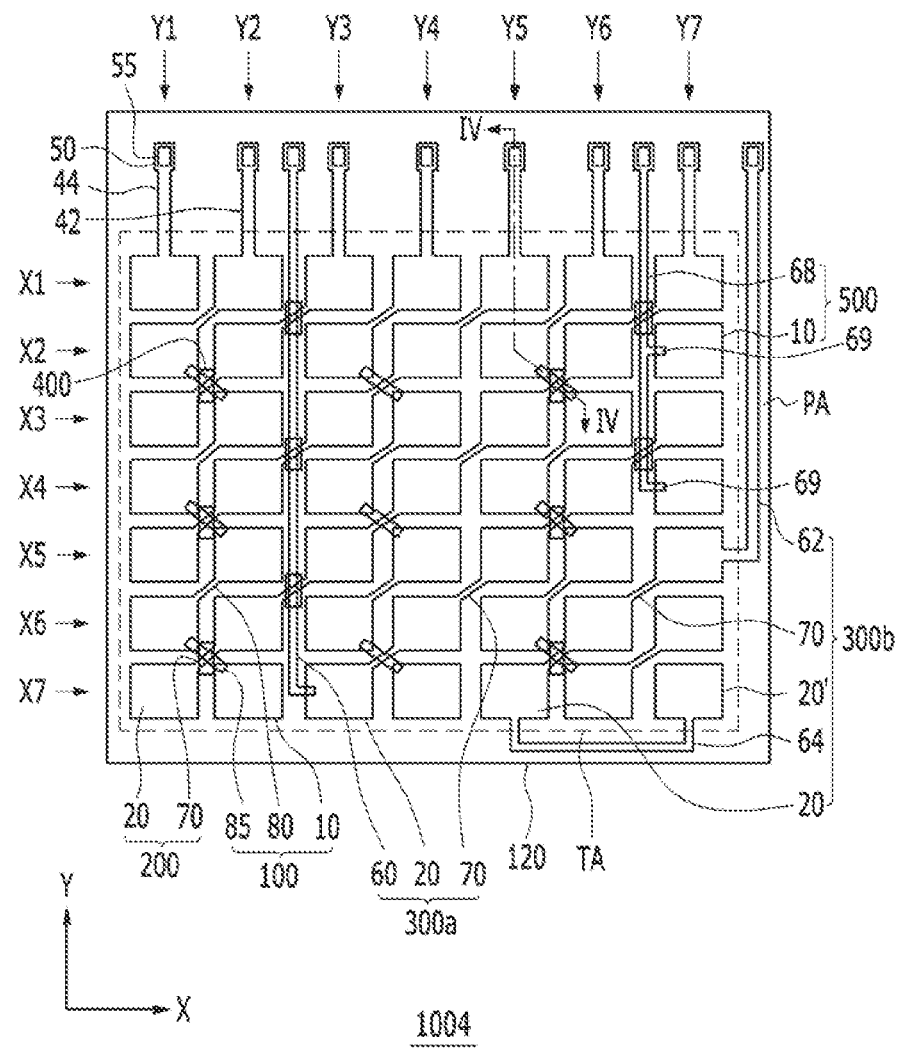
FIG. 3 is a layout view of touch electrodes of a touch panel according to another exemplary embodiment.
Figure 4:
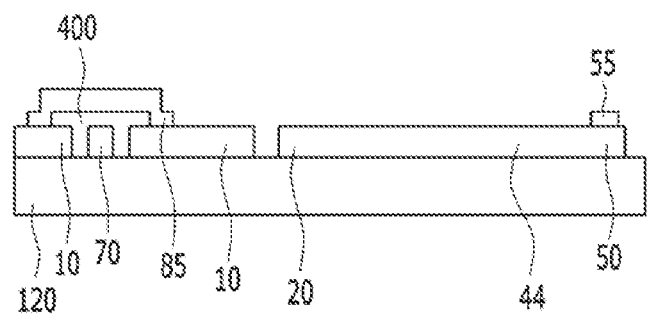
FIG. 4 is a cross-sectional view taken along line IV-IV of FIG. 3.

FIG. 3 is a layout view of touch electrodes of a touch panel according to another exemplary embodiment, and FIG. 4 is a cross-sectional view taken along line IV-IV of FIG. 3.

As illustrated in FIGS. 3 and 4, a touch panel 1004 according to an exemplary embodiment may include first touch electrode lines 100 and 500 and second touch electrode lines 200, 300a, and 300b formed on a substrate 120.

The substrate 120 may be glass or plastic, such as polycarbonate, polyimide, and polyether sulfone. The substrate 120 may be a transparent flexible substrate having pliability being able to fold, bend, and roll. The substrate 120 may also have elasticity, being able to stretch in at least one direction.

The first touch electrode lines 100 include a plurality of electrically connected first touch electrodes 10. Similarly, the second touch electrode lines 200, 300a, and 300b include a plurality of electrically connected second touch electrodes 20.

The first touch electrodes 10 may be separated from the second touch electrodes 20. The first touch electrodes 10 may be formed on the same layer as the second touch electrodes 20. The first touch electrodes 10 and the second touch electrodes 20 may include a transparent conductive material, such as indium tin oxide (ITO) or indium zinc oxide (IZO). The first touch electrodes 10 and second touch electrodes 20 may include a metal nanowire formed of copper (Cu) or silver (Ag).

The first touch electrodes 10 and the second touch electrodes 20 may form a matrix in the touch sensing area TA. The first and second touch electrodes 10, 20 may be dispersed alternatively when disposed to prevent the first touch electrodes 10 from overlapping the second tough electrodes 20 and vice versa. For example, in an X-axis direction, the first touch electrodes 10 and the second touch electrodes 20 are disposed alternatively as a row, and in a Y-axis direction, the first touch electrodes 10 and the second touch electrodes 20 are also disposed alternatively as a column.

The first touch electrode lines 100 include a plurality of first touch electrodes 10, first connection electrodes 80, and second connection electrodes 85. The first electrode lines 100 are electrically connected by connecting the two neighboring rows of first touch electrodes 10. The neighboring rows of first touch electrodes 10 are alternately disposed in a diagonal direction and connected to each other via first connection electrodes 80 and second connection electrodes 85. For example, referring to FIG. 3, the first touch electrode 10 positioned in a first row and second column (X1Y2) is connected to the first touch electrode 10 positioned in the second row and first column (X2Y1) by the first connection electrode 80. The same first touch electrode 10 positioned in a second row and first column (X2Y1) is also connected to the first electrode 10 positioned in the third row and second column (X3Y2) by the second connection electrode 85.

In this manner, the first touch electrode lines 100 are formed in a zigzag manner by electrically connecting the first touch electrodes 10 positioned in the first column Y1 and the second column Y2 by the first connection electrode 80 and the second connection electrode 85.

The first connection electrodes 80 may be formed of the same material as the first touch electrodes 10. The second connection electrodes 85 are sloped in a direction opposite to that of the first connection electrodes 80, and may intersect third connection electrodes 70 of the second touch electrode lines 200. The third connection electrodes 70 may be formed in the same diagonal direction as the first connection electrodes 80.

The first touch electrodes 10 and the second touch electrodes 20 may be formed on the same layer. Thus, in order to prevent the second connection electrodes 85 intersecting and short-circuiting with the third connection electrodes 70 of the second touch electrode lines 200, the second connection electrodes 85 may be formed of a material different from that of the first touch electrodes 10 and formed on a layer different from the first touch electrodes 10. More specifically, an insulating layer 400 may be formed to overlap the first touch electrode lines 100 in the portions where the second connection electrodes 85 intersect the first touch electrode lines 100. The second connection electrodes 85 may be formed on the insulting layer 400.

In an embodiment, the insulating layer 400 may be formed on the entire surface of the substrate 120. When the insulating layer 400 is formed on the entire surface of the substrate 120, the second connection electrodes 85 may electrically connect the first touch electrodes 10 positioned in the diagonal direction though contact holes (not shown) formed on the insulating layer. Other embodiments for forming the insulating layer and its location are envisioned.

The second touch electrode lines 200, 300a, and 300b include a plurality of second touch electrodes 20 and a plurality of third connection electrodes 70. The second touch electrodes 20 disposed in a diagonal direction D and are electrically connected by the third connection electrodes 70. For example, referring to FIG. 3, the second touch electrode 20 positioned in the first row and seventh column (X1Y7) is connected to the second touch electrode 20 positioned in the second row and sixth column (X2Y6) by the third connection electrode 70. The same second touch electrode 20 positioned in the second row and sixth column (X2Y6) is connected to the second touch electrode 20 positioned in the third row and fifth column (X3Y5) by the third connection electrode 70.

In this manner, the second touch electrodes are electrically connected by the third connection electrodes 70 to form the second touch electrode lines 200, 300a, and 300b extending in the diagonal direction D.

The third connection electrodes 70 may be formed of the same material as the first touch electrodes 20. The third connection electrodes 70 may intersect and be insulated from the second connection electrodes 85 with the insulating layer 400 interposed between the third connection electrodes 70 and the second connection electrodes.

In the exemplary embodiment described above, it is described that the second connection electrodes 85 are formed on a layer different from the first touch electrodes 10 and the first connection electrodes 80 and the third connection electrodes 85 are formed on the same layer as the first touch electrodes 10 and the second touch electrodes 20. However, the present disclosure is not limited to such an embodiment. If necessary, the first connection electrodes 80 or the third connection electrodes 70 may be formed on a layer different from that of the first touch electrodes 10 and the second touch electrodes 20.

The first touch electrode lines 100 and the second touch electrode lines 200 are connected to the first and second pad signal lines 42 and 44 positioned in the peripheral area PA of the touch panel. The first and second pad signal lines 42 and 44 have extending portions 50 formed by extending one end thereof so as to be connected to the driving unit, and pads 55 formed on the extending portions 50.

The pads 55 may be formed of a low resistive metal such as copper. The pads 55 may be formed of the same material as the second connection electrodes 85. The pads 55 may also be formed with the second connection electrodes 85.

The second touch electrode lines 200 including the second touch electrodes 20 positioned in the first row may be directly connected to driving unit through the pad signal line 44. However, the second touch electrode lines 300a and 300b without second touch electrodes 20 positioned in the first row may be connected to the driving unit by connection signal lines 60 and/or a first auxiliary pad signal line 62.

As illustrated in FIG. 3, the connection signal lines 60 may be positioned between two neighboring columns and may separate neighboring first touch electrodes 10 and second touch electrodes 20. The connection signal line 60 may intersect the third connection electrodes 70. Thus, the insulating layer 400 may be formed to prevent the intersections from being short-circuited.

The connection signal lines 60 may be formed of a material different from that of the first touch electrodes and the second touch electrodes. However, the connection signal lines 60 may be the same material as the second connection electrodes 85 and the pads 55 and formed with the second connection electrodes 85 and the pads 55.

Also, as illustrated in FIG. 3, the first auxiliary pad signal line 62 may be positioned in the peripheral area PA outside the touch area TA. The first auxiliary pad signal line 62 may be formed in the column direction. The first auxiliary pad signal line 62 may be formed with the second touch electrodes 20 connected to the first auxiliary pad signal lines 62. The first auxiliary pad signal line 62 may be the same material as the second touch electrodes 20 connected to it. In an embodiment, the first auxiliary pad signal line 62 may be formed with the connection signal lines 60 positioned between two columns.

The width of the peripheral area PA may increase to accommodate forming the first auxiliary pad signal line 62. Because related art have a larger number of pad signal lines than the described embodiment, the width of the peripheral area PA of the described embodiment may be smaller than that of the related art.

In an embodiment, the second touch electrode 20' positioned in the corner of the touch area TA may be electrically connected to one end of another second touch electrode 20 of the second electrode line 300b by an auxiliary line 64. The auxiliary line 64 may be positioned in the peripheral area PA and may be formed in the row direction.

The first touch electrode lines 100 may further include a first touch electrode line 500 which has a linear form, rather than a zigzag form. Some of the first touch electrode lines 100 may have a zigzag form by alternately connecting the first touch electrodes 10 positioned in two columns. However, when the column formed in the touch area TA is an odd number, as illustrated in FIG. 3, the first touch electrode 10 positioned in the last column does not zigzag. For example, the first touch electrode 10 positioned in the second row and seventh column (X2Y7) and the first touch electrode 10 positioned in the fourth row and seventh column (X4Y7) are linear and do not zigzag.

The first touch electrode line 500 positioned in the last column may be connected to a second pad signal line 68 positioned to be spaced apart from the last column within the touch area TA. The second pad signal line 68 has a plurality of protrusions 69 protruding toward the first touch electrodes 10 positioned in the last column. The protrusions 69 are electrically connected to the first touch electrode 10 positioned in the second row and seventh column (X2Y7) and the first touch electrode 10 positioned in the fourth row and seventh column (X4Y7). Together these first touch electrodes 10 of the last column form the linear first touch electrode line 500.

Figure 5:
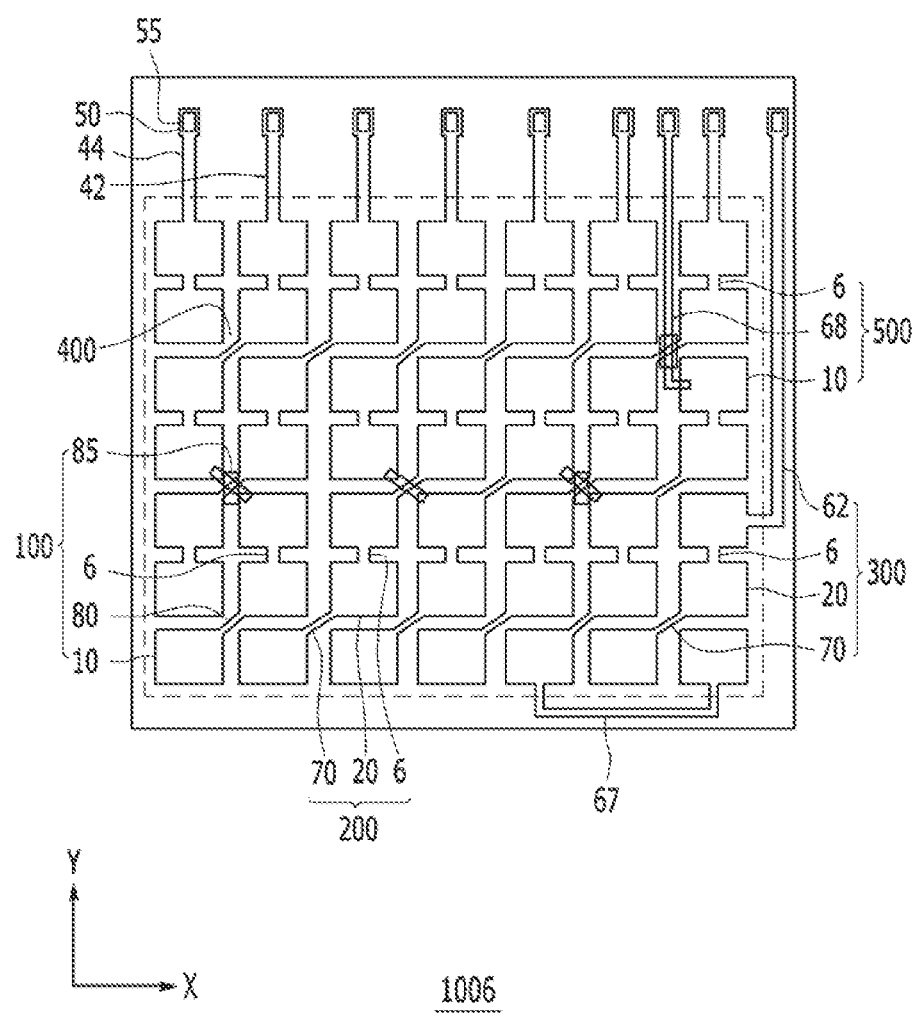
FIG. 5 is a layout view of touch electrodes of a touch panel according to another exemplary embodiment.

FIG. 5 is a layout view of touch electrodes of a touch panel according to another exemplary embodiment.

A touch panel of FIG. 5 is mostly same as the touch panel of FIG. 3, and thus, only differences thereof will be described in detail.

A touch panel 1006 of FIG. 5 includes first touch electrode lines 100 and 500 and second touch electrode lines 200 and 300 formed on a substrate 120.

The first touch electrode lines 100 and 500 include a plurality of first touch electrodes 10, first connection electrodes 80 and second connection electrodes 85. The second touch electrode lines 200 and 300 include a plurality of second touch electrodes 20 and third connection electrodes 70.

The first touch electrode lines 100 and 500 and the second touch electrode lines 200 and 300 may be connected to pad signal lines 42 and 44, auxiliary pad signal lines 62 and 68, and a connection line 67.

The first touch electrode lines 100 and 500 and the second touch electrode lines 200 and 300 of FIG. 5 may further include vertical connection electrodes 6 for connecting touch electrodes positioned in adjacent two rows. The vertical connection electrodes 6 connect two touch electrodes which neighbor in the column direction (Y).

More specifically, the first touch electrode 10 and the second touch electrode 20 are alternately disposed in every column in the row direction (X). The first touch electrodes 10 are continuously formed in two rows in the column direction (Y) and connected by the vertical connection electrodes 6. Because the second touch electrodes 20 are also continuously formed in two rows and connected by the vertical connection electrodes 6, the first touch electrodes and the second touch electrodes are alternately disposed in every two rows.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:
1. A touch sensor comprising:
   first touch electrode lines disposed in a touch sensing area and extending in a first direction;
   second touch electrode lines extending in a second direction which is oblique to the first direction;
   a driving unit;
   pad signal lines connecting the driving unit to the first touch electrode lines and the second touch electrode lines; and
   a connection signal line disposed in the touch sensing area and extending in the first direction,
   wherein the connection signal line comprises a first end connected to one of the pad signal lines and a second end connected to one of the second touch electrode lines,
   wherein a first touch electrode line crosses a second touch electrode line,
   wherein a peripheral area is disposed outside of the touch sensing area, and
   wherein the second touch electrode lines diagonally traverse the touch sensing area from one side of the touch sensing area to another side of the touch sensing area.

2. The touch sensor of claim 1, further comprising:
an insulating layer insulating intersecting portions of the first touch electrode lines and the second touch electrode.

3. The touch sensor of claim 1, wherein:
the first touch electrode lines and the second touch electrode lines each comprise a plurality of touch electrodes and connection electrodes connecting neighboring touch electrodes, and
the connection electrodes connect two touch electrodes disposed in the second direction.

4. The touch sensor of claim 3, wherein:
a connection electrode of the first touch electrode lines is disposed in a layer different from that of the touch electrodes.

5. The touch sensor of claim 3, wherein:
a connection electrode of the second touch electrode lines is disposed in a layer different from that of the touch electrodes.

6. The touch sensor of claim 1, wherein:
the signal line is disposed on a layer different from the touch electrode.

7. A touch panel comprising:
a substrate comprising a touch sensing area and a peripheral area disposed on an outer side of the touch sensing area;
a plurality of first touch electrode lines disposed in the touch sensing area and extending in a first direction;
a plurality of second touch electrode lines extending in a second direction which is oblique to the first direction and disposed in the touch sensing area;
a plurality of first pad signal lines connected to the first touch electrode lines and disposed on one side of the peripheral area;
a plurality of second pad signal lines connected to the second touch electrode lines and disposed on a same side of the peripheral area as the first pad signal lines; and
a connection signal line disposed in the touch sensing area and extending in the first direction,
wherein the connection signal line comprises a first end connected to a pad signal line of the plurality of second pad signal lines and a second end connected to one of the second touch electrode lines,
wherein two second touch electrode lines have different lengths, and
wherein the second touch electrode lines diagonally traverse the touch sensing area from one side of the touch sensing area to another side of the touch sensing area.

8. The touch panel of claim 7, wherein:
a second touch electrode line closer to a center of the touch sensing area is longer than a second touch electrode line further from the center of the touch sensing area.

9. The touch panel of claim 7, wherein:
a second touch electrode line adjacent to the second pad signal lines is directly connected to the second pad signal lines.

10. The touch panel of claim 7, wherein:
a second touch electrode line distant from the second pad signal lines is indirectly connected to a second pad signal line through the connection signal line.

11. The touch panel of claim 10, wherein:
the connection signal line is disposed between two first touch electrode lines in the touch sensing area.

12. The touch panel of claim 7, wherein:
first touch electrode lines comprise:
a plurality of first touch electrodes;
first connection electrodes; and
second connection electrodes; and
second touch electrode lines comprise:
a plurality of second touch electrodes;
and third connection electrodes.

13. The touch panel of claim 12, wherein:
the first touch electrodes and the second touch electrodes are disposed alternately to prevent overlapping of the first touch electrodes and second touch electrodes.

14. The touch panel of claim 12, wherein:
the first connection electrodes are disposed on a same layer as the first touch electrodes; and
the first connection electrodes comprise a same material as the first touch electrodes.

15. The touch panel of claim 12, wherein:
the third connection electrodes are disposed on a same layer as the second touch electrodes; and
the third connection electrodes comprise a same material as the second touch electrodes.

16. The touch panel of claim 15, further comprising:
an insulating layer disposed between the third connection electrodes and the second connection electrodes.

17. The touch panel of claim 7, wherein:
the substrate comprises a transparent flexible substrate.

* * * * *